United States Patent [19]

Vogel et al.

[11] Patent Number: 4,511,636

[45] Date of Patent: Apr. 16, 1985

[54] MOLTEN CARBONATE FUEL CELL MATRICES

[75] Inventors: Wolfgang M. Vogel, Glastonbury; Stanley W. Smith, Vernon, both of Conn.

[73] Assignee: The United States of America as represented by the United States Department of Energy, Washington, D.C.

[21] Appl. No.: 549,380

[22] Filed: Nov. 7, 1983

[51] Int. Cl.$^3$ .............................................. H01M 4/86
[52] U.S. Cl. .......................................... 429/41; 429/46
[58] Field of Search ........................ 429/40, 41, 44, 45

[56] References Cited

U.S. PATENT DOCUMENTS

| | | | |
|---|---|---|---|
| 3,644,147 | 2/1972 | Young | 429/40 |
| 4,206,270 | 6/1980 | Kunz et al. | 429/40 |
| 4,361,631 | 11/1982 | Iacovangelo et al. | 429/40 |
| 4,436,794 | 3/1984 | Takeuchi et al. | 429/40 |

FOREIGN PATENT DOCUMENTS 1070937  6/1967  United Kingdom .

OTHER PUBLICATIONS

SAN-1485-1, "Evaluation of MHD Materials for use in High–Temperature Fuel Cells", Jun. 15, 1978, R. Guidotti.
DOE/ET/15440-10, "Developement of Molten Carbonate Fuel Cell Power Plant Technology", Apr. 1982.
Chemical Abstracts, "Ceramic Dielectrics for Capacitors", vol. 90, 113, 941, (1979).

*Primary Examiner*—Charles F. LeFevour
*Attorney, Agent, or Firm*—Hugh W. Glenn; Robert J. Fisher; Judson R. Hightower

[57] ABSTRACT

A molten carbonate fuel cell including a cathode electrode of electrically conducting or semiconducting lanthanum containing material and an electrolyte containing matrix of an electrically insulating lanthanum perovskite. In addition, in an embodiment where the cathode electrode is $LaMnO_3$, the matrix may include $LaAlO_3$ or a lithium containing material such as $LiAlO_2$ or $Li_2TiO_3$.

14 Claims, No Drawings

MOLTEN CARBONATE FUEL CELL MATRICES

CONTRACTUAL ORIGIN OF THE INVENTION

The United States Government has rights in this invention under Contract No. DE-AC01-79ET15440 between the U.S. Department of Energy and United Technology Corporation.

BACKGROUND OF THE INVENTION

This invention relates to molten carbonate fuel cells and more particularly to materials for the cathode and matrix for molten carbonate fuel cells.

Molten carbonate fuel cells convert the chemical energy of gasifier fuel gases directly into electricity without an intermediate conversion either to heat or to mechanical energy. The electrical chemical fuel cells consist of two porous electrodes separated by an electrolyte contained within a porous matrix. Several hundred single-cell units are generally assembled together to form a molten carbonate fuel cell stack of the size desired.

Prior art anode electrodes for molten carbonate fuel cells were made of nickel or cobalt, for example. Prior art cathode electrodes of these cells were made of silver or nickel, the nickel oxidizing during cell operation providing the catalytic activity of the cathode. However, in catalyzing the reduction of oxygen to accelerate the cathode reaction, the oxidation of the nickel to nickel oxide results in loss of structural integrity of the electrode.

More recently, molten carbonate fuel cells have been proposed which employ a perovskite material as the cathode catalyst. The perovskites are good cathode catalysts for the reduction of oxygen in a molten carbonate electrolyte. One advantage of the use of perovskites is that they are already oxides and therefore do not oxidize during use. Consequently, it is easier to control the structural characteristics which such materials have during operation, particularly as compared to using nickel to form the cathode. However, reactions between the cathode catalyst of molten carbonate fuel cells and other cell compounds tend to limit the usefulness of certain combination catalyst-cell matrix. This is particularly true for lanthanum containing catalysts. For instance, $LaNiO_3$ reacts with matrix fillers such as $LiAlO_2$ or $Li_2TiO_3$ to form mixed oxides containing La-Al or La-Ti, and the catalyst decomposes to lithiated NiO.

SUMMARY OF THE INVENTION

One object of the present invention is to provide an improved molten carbonate fuel cell.

A more particular object of the present invention is to provide an improved molten carbonate fuel cell in which chemical decomposing of the cathode catalyst is substantially eliminated.

According to the present invention, the cathode catalyst for a molten carbonate fuel cell includes an electrically conductive or semiconductive lanthanum containing material and the electrolyte containing matrix includes electrically insulating oxygenates of lanthanum or lithium. A preferred group of cathode materials is $LaNiO_3$, $La_2NiO_4$, $LaCoO_3$, and $LaMnO_3$. Materials for the matrix filler include $LaAlO_3$ or mixed La-Ti oxides. When the matrix contains a lanthanum oxide, there exists virtually no risk of decomposition of the lanthanum in the catalyst because the driving force for the decomposition of the cathode catalyst is eliminated.

When the lanthanum containing transition metal oxide $LaMnO_3$ is used for the cathode catalyst, the catalyst is sufficiently stable to be used with a matrix formed from other materials such as $LiAlO_2$, and $Li_2TiO_3$ since the $LaMnO_3$ does not interact with these matrix materials.

The foregoing and other objects, features and advantages of the present invention will become more apparent in light of the following detailed description.

DESCRIPTION OF THE PREFERRED EMBODIMENTS

In accordance with one embodiment, the molten carbonate fuel cell provided by the present invention includes the combination of a porous cathode catalyst containing an electrically conductive or semiconductive lanthanum containing material with a porous matrix for a molten carbonate electrolyte. The matrix includes the perovskite $LaAlO_3$. The matrix with a lanthanum containing perovskite can be used advantageously with any lanthanum containing catalyst, but in accordance with one embodiment, the cathode is made of a lanthanum containing catalyst such as $LaNiO_3$, $LaMnO_3$, $La_2NiO_4$ or $LaCoO_3$.

The matrix materials are made by the direct reaction of the finely powdered oxides. The materials for all of the cathode catalysts are made by thermal means, generally by firing at approximately 1100° C. finely ground mixtures of the appropriate oxides in air. The surface areas which result from this technique are in the order of 1 $m^2/gm$. One preparation of $LaMnO_3$ was made using a precipitation of the mixed hydroxides followed by firing in air which gave a product having a surface area in the order of 15 $m^2/gm$. Many procedures, both chemical and physical, are well documented and available to produce higher surface areas.

The lanthanum containing cathode catalyst and matrix materials were tested in half cells and found to be active for oxygen reduction. The tests were conducted to determine the catalyst stability and solubility in a system with an anode present to serve as a sink for dissolved species, as in the reduction of dissolved NiO to nickel metal. The molten-carbonate electrolyte used was an eutectic mixture of 62 m/o $Li_2CO_3$ and 38 m/o $K_2CO_3$, with a melting point of 491° C.

EXAMPLE 1

One half cell constructed and tested included a $LaAlO_3$ matrix and a $LaMnO_3$ cathode. The half cell was essentially phase stable in potential tests, and remained stable for temperatures in excess of 1250° C. The test demonstrated that the $LaMnO_3$ cathode catalyst does not react with th $LaAlO_3$ matrix and exhibited low solubility in the order of 2.3 ppm.

EXAMPLE 2

The matrix material contained $LaAlO_3$ and the cathode catalyst was formed from $LaNiO_3$. The cell was essentially stable in potential tests. Sintering the cathode from the $LaNiO_3$ powder required subjecting the material to temperatures of about 1100° C. to achieve physical stability. The perovskite was converted to a new compound by the following reaction:

$$2LaNiO_3 = La_2NiO_4 + NiO + \tfrac{1}{2}O_2$$

The resulting cell was started with a cathode containing a mixture of perovskite, the $La_2NiO_4$ compound and nickel oxide on the assumption that it would react to give the perovskite at cell temperature, that is being the stable phase. The post test analysis demonstrated that reversion to the perovskite did occur. However, an amount of NiO also remained, indicating loss of La had occurred in the process. This test indicates that a matrix with a lanthanum containing perovskite can be used advantageously with any lanthanum containing catalyst whether or not a perovskite. For example, a cathode containing $La_2NiO_4$ would benefit from the use of a non-conducting perovskite material for the matrix.

EXAMPLE 3

The matrix material contained $LaAlO_3$ and the cathode catalyst was formed from $LaCoO_3$. The half cell was phase stable in potential tests and remained stable for temperatures in excess of 1250° F.

In accordance with another embodiment of the invention, a molten carbonate fuel cell includes the combination of a porous cathode catalyst containing an electrically conductive or semiconductive lanthanum containing material, such as $LaNiO_3$, $LaMnO_3$, $La_2NiO_4$ or $LaCoO_3$, and an electrolyte containing matrix made of mixed La-Ti oxides. With such catalyst-matrix combination, there exists virtually no risk of decomposition of the lanthanum in the catalyst due to interaction between the cathode catalyst and other cell compounds.

Catalyst modification may be used to provide an increase in conductance of the cathode catalyst in use. For example, to provide an increase in conductance of $LaMnO_3$ as the electrode is polarized in use, the cathode material $LaMnO_3$ is modified to promote the amount of Mn in the $+4$ state by replacing part of the $La^{+3}$ with a lower valent ion having the proper ionic radius to take it's place in the structure. Materials which meet the criteria for valence and size are $Ca^{+2}$, $Sr^{+2}$, $Cd^{+2}$, and $K^+$. Replacing of some $La^{+3}$ with $Sr^{+2}$, providing a p-type semiconducting material, $La_{1-x}Sr_xMnO_3$, is well known as a method of increasing conductivity. One example of a specific material is $La_{0.8}Sr_{0.2}MnO_3$. Alternatively, some Zr can be substituted for La to make n-type material $La_{1-x}Zr_xMnO_3$.

The same technique can be used when the catalyst is $LaNiO_3$ in which case the modification is to promote the amount of Ni in the $+3$ state. For example, to provide an increase in conductance of $LaNiO_3$ as the electrode is polarized in use, the $LaNiO_3$ is modified with $+1$ or $+2$ valent material such as Sr to promote $+3$ state for Ni form resulting in $La_{1-x}Sr_xNiO_3$, or in preferred form $La_{0.8}Sr_{0.2}NiO_3$.

Modification of $LaCoO_3$ can be used to reduce solubility, in which case a portion of the Co is replaced with Fe or Ni, providing $LaCo_{1-x}Fe_xO_3$ or $LaCo_{1-x}Ni_xO_3$, respectively. An example of a specific material is $LaCo_{0.5}Fe_{0.5}O_3$.

In the foregoing examples, the matrix was made with a lanthanum containing material. The present invention also contemplates the use in a molten carbonate fuel cell of the combination of a cathode catalyst containing La-Mn oxide $LaMnO_3$ with a matrix material containing lithium formed from aluminates such as $LiAlO_3$ or an alkali titanate such as $Li_2TiO_3$ or mixtures thereof.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description is offered by way of illustration only and not as a limitation. The actual scope of the invention is intended to be defined in the following claims when viewed in their proper perspective based on the prior art.

The embodiments of the invention in which an exclusive property or privilege is claimed are defined as follows:

1. A molten carbonate fuel cell comprising: an anode electrode; a cathode electrode; and a matrix containing an electrolyte which is molten during operation of the fuel cell, the two electrodes being separated by the electrolyte contained within the matrix, the cathode electrode including electrically non-insulating lanthanum containing material and the matrix including an electrically insulating lanthanum oxygenate.

2. A fuel cell according to claim 1 wherein the matrix material includes a mixed oxide of lanthanum and titanium.

3. A fuel cell according to claim 1 wherein the matrix material is $LaAlO_3$.

4. A fuel cell according to claim 1 wherein the lanthanum containing cathode material is selected from the group consisting of $LaMnO_3$, $LaNiO_3$ and $La_2NiO_4$.

5. A fuel cell according to claim 4 wherein the lanthanum containing cathode material is modified by replacing a portion of the lanthanum with a lower valent material selected from the group consisting of Sr, Zr, Ca, K and Cd.

6. A fuel cell according to claim 1 wherein the lanthanum containing cathode material is $LaCoO_3$.

7. A fuel cell according to claim 6 wherein the lanthanum containing cathode material is modified by replacing a portion of the cobalt with a lower valent Fe or Ni.

8. A fuel cell according to claim 1 wherein the lanthanum containing cathode material is selected from the group consisting of $La_{0.8}Sr_{0.2}MnO_3$, $LaCo_{0.5}Fe_{0.5}O_3$ and $La_{0.8}Sr_{0.2}NiO_3$.

9. A fuel cell according to claim 1 wherein the lanthanum containing material for the cathode is $LaMnO_3$, and wherein the matrix material includes $LaAlO_3$.

10. A molten carbonate fuel cell comprising: an anode electrode; a cathode electrode; and a porous matrix containing an electrolyte which is molten during operation of the fuel cell, the two electrodes being separated by the electrolyte contained within the matrix, the cathode electrode including an electrically non-insulating lanthanum containing material and the matrix including an electrically insulating lanthanum containing perovskite.

11. A fuel cell according to claim 10 wherein the lanthanum containing cathode material is selected from the group consisting of $LaMnO_3$, $LaCoO_3$, $LaNiO_3$, and $La_2NiO_4$.

12. A fuel cell according to claim 10 wherein the matrix material is $LaAlO_3$.

13. A fuel cell according to claim 10 wherein the matrix material includes a mixed oxide of lanthanum and titanium.

14. A molten carbonate fuel cell comprising an anode electrode; a cathode electrode; and a porous matrix containing an electrolyte which is molten during operation of the fuel cell, the two electrodes being separated by the electrolyte contained within the matrix, the cathode material including $LaMnO_3$ and the matrix material includes $Li_2TiO_3$.

* * * * *